Aug. 31, 1926.

E. J. ARMSTRONG 1,598,412

RATCHET MECHANISM

Original Filed Oct. 30, 1919   3 Sheets-Sheet 1

Inventor
Edwin J. Armstrong
by W.R. Litzenberg
Attorney

Aug. 31, 1926.

E. J. ARMSTRONG 1,598,412

RATCHET MECHANISM

Original Filed Oct. 30, 1919   3 Sheets-Sheet 3

Inventor
Edwin J. Armstrong
by
Attorney

Patented Aug. 31, 1926.

1,598,412

UNITED STATES PATENT OFFICE.

EDWIN J. ARMSTRONG, OF ERIE, PENNSYLVANIA, ASSIGNOR TO BALL ENGINE COMPANY, OF ERIE, PENNSYLVANIA, A CORPORATION OF PENNSYLVANIA.

RATCHET MECHANISM.

Original application filed October 30, 1919, Serial No. 334,515. Divided and this application filed February 26, 1923. Serial No. 621,333.

In many devices such as winding drums it is not only necessary to be able to wind the drum in a winding-up direction but it is also necessary to control the unwinding of the drum under load. The present invention is well designed for this purpose and accomplishes the same in a simple and efficient manner. The structure here shown and claimed forms a division of application filed by me Oct. 30th, 1919, No. 334,515.

The invention is illustrated in the accompanying drawings as follows:—

Figure 1:
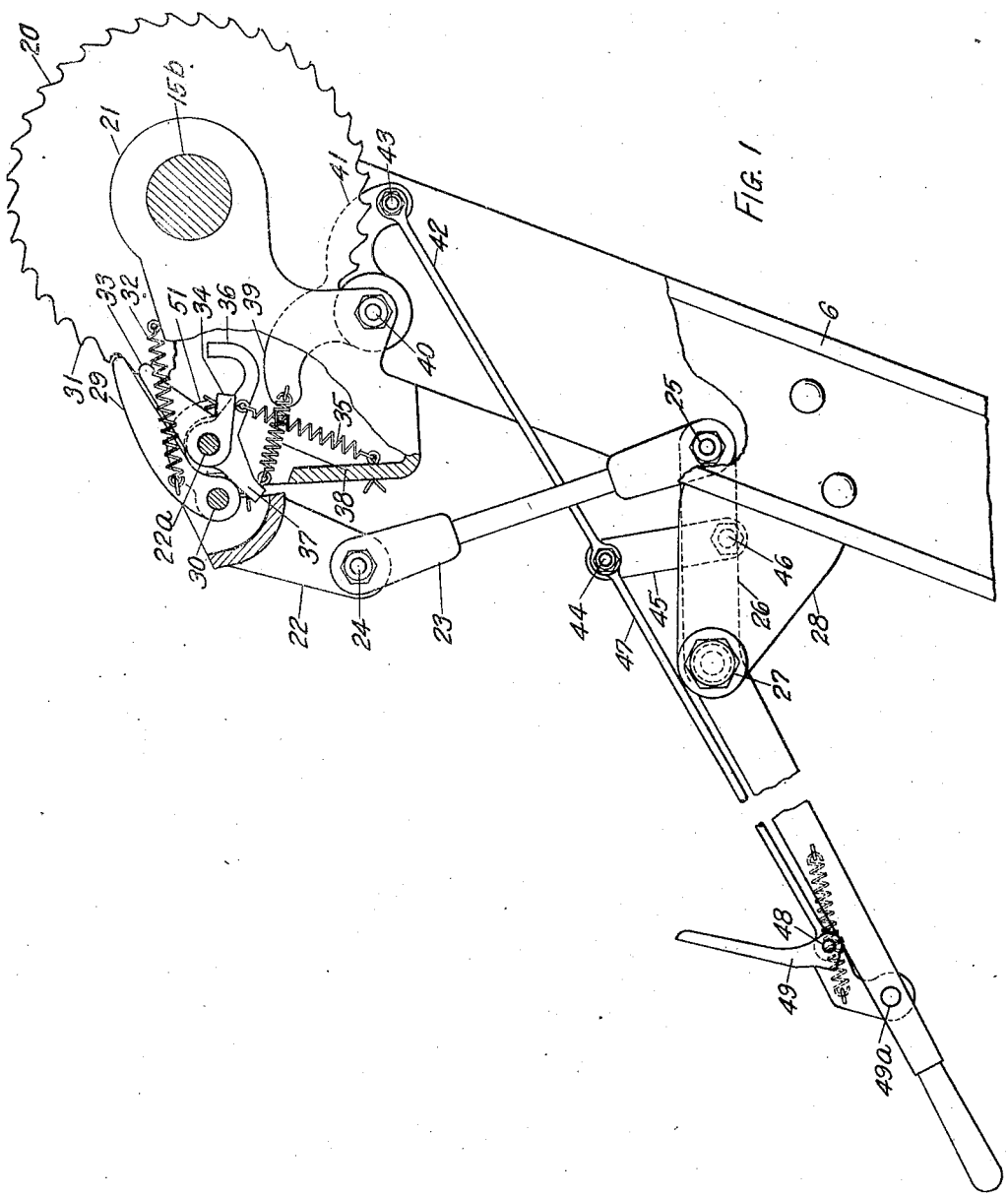

Fig. 1 shows a side elevation, partly in section, of the ratchet mechanism in position for winding a drum or reel.

Figure 2:
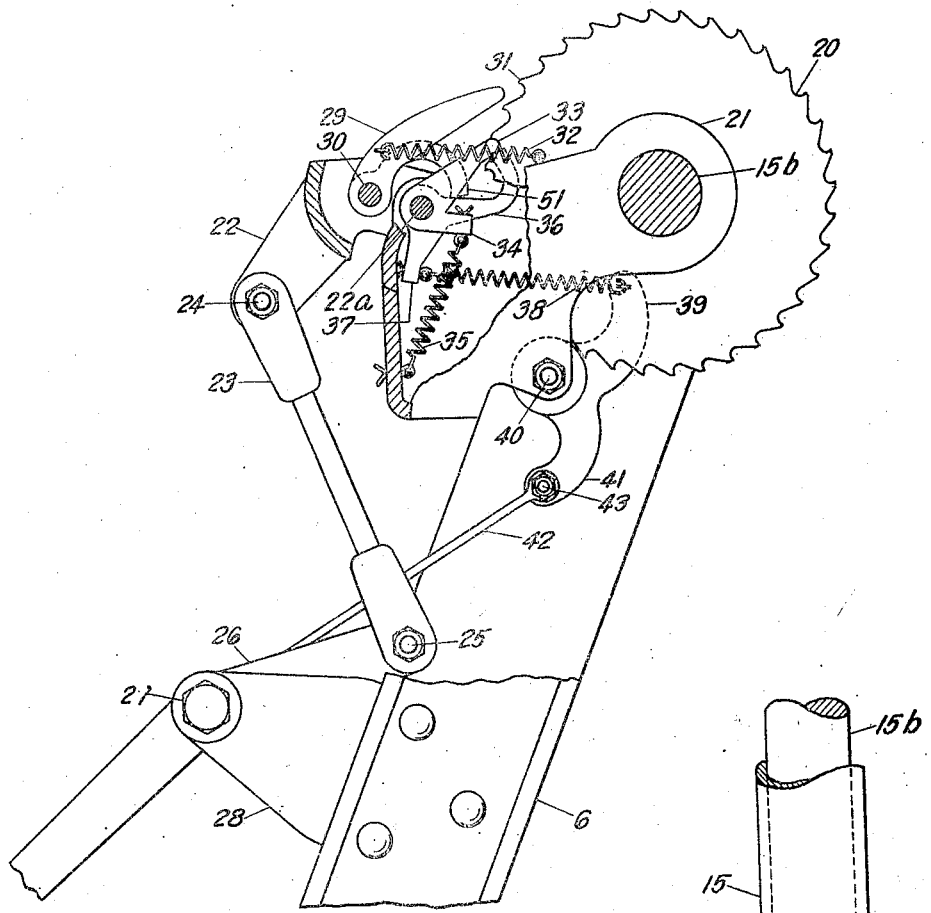

Fig. 2 a similar view of the same mechanism, the parts being in position for unwinding the drum.

Figure 3:
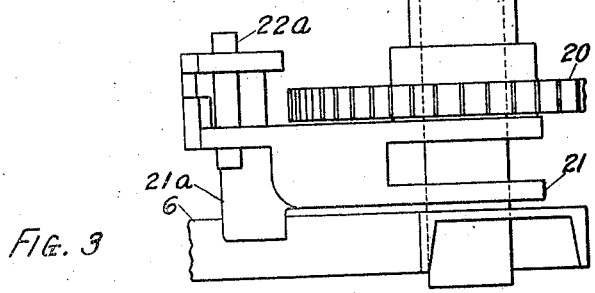

Fig. 3 a plan view of the ratchet end of the drum.

Figure 4:
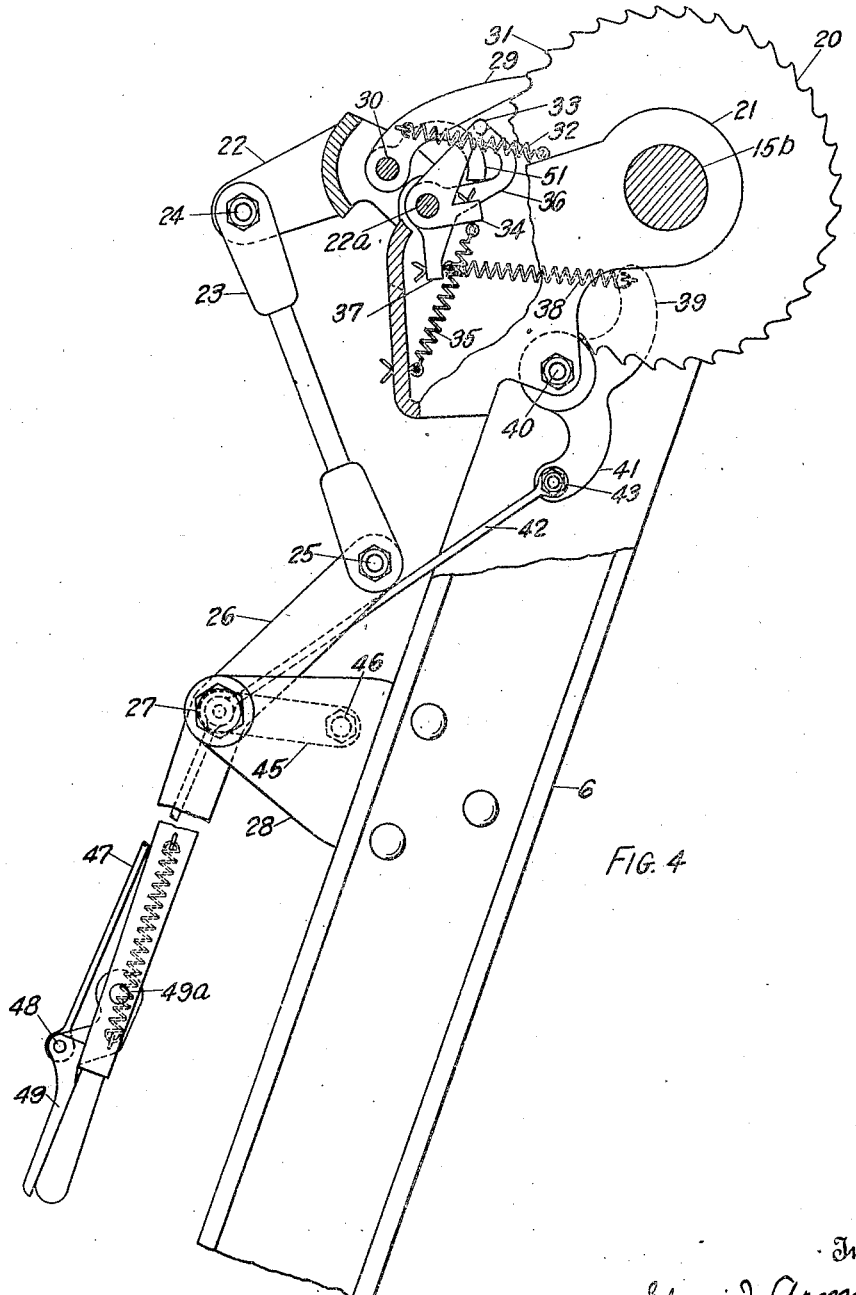

Fig. 4 a view similar to Fig. 2 except that the parts have been moved to a different position in the cycle of operation of unwinding the reel or drum.

15 marks the reel. This is carried by a shaft 15$^b$ in supports 6. A ratchet wheel 20 is fixed on the end of the reel 15. A pawl carrier 21 is mounted on the rod 15$^b$ and a bracket 21$^a$ which extends from the strut 6. A pawl lever 22 is pivotally mounted on the carrier 21 by means of a pin 22$^a$. A link 23 is pivotally connected with the lever 22 by means of a pin 24 and with an operating lever 26 by means of a pin 25. The operating lever is pivotally mounted on a bracket 28 by means of a pin 27. A pawl 29 is pivotally mounted on the pawl lever 22 by means of a pin 30 and is adapted to operate against the teeth 31 on the ratchet wheel 20. The pawl 29 thus forms the swinging pawl. A spring 32 pulls the pawl toward or into engagement with the ratchet wheel. A pawl 33 is pivotally mounted on the pin 22$^a$. It, therefore, has a fixed pivotal support. An arm 34 extends from this pawl and a spring 35 extends from the arm 34 to a part of the pawl carrier 21. The spring swings the pawl 33 into engagement with the ratchet 20 so as to lock the ratchet against unwinding as the pawl 29 is retracted after being advanced. By observing the parts as shown in Fig. 1 the operation of the step by step mechanism for the winding up operation is made clear. As the operating lever 26 is reciprocated the pawl lever 22 is reciprocated, reciprocating the pawl 29 and thus advancing tooth by tooth the ratchet wheel 20, the ratchet wheel being caught and held against a return movement by the pawl 33.

In order that the step by step mechanism may be utilized for releasing the support, that is, unwinding the reel under load it is provided with the following mechanism: A disengaging finger or dog 36 is provided on the pin 22$^a$ and has an arm 37 from which extends a spring 38. The spring 38 is carried by the lever 39, the lever being pivoted on a pin 40 in the pawl carrier. The lever has an extension or arm 41 to which link 42 is attached by a pin 43. The link 42 is connected by a pin 44 with an arm 45. The arm 45 is pivotally mounted by a pin 46 on the bracket 28. A link 47 extends from the pin 44 to a grip lever 49 pivoted at 49$^a$, the link being connected to this lever by means of a pin 48. When the grip lever is swung to the position shown in Figs. 2 and 4 the pin 44 is brought approximately to the center of the pin 27 so that the link 42 remains stationary as the operating lever is operated.

The releasing mechanism operates as follows: It will be noted that as the link 42 is pulled down through the grip lever 49, the spring 38 is put under tension. The spring 38 is stronger than the spring 35. The release dog 36 is under the influence of the spring 38 and operates against the pawl 33 so that when there are no other agencies in action the release dog operating under the influence of the spring 38 will overcome the spring 35 and move the pawl 33 out of the path of the ratchet, the position assumed under these conditions being shown in Fig. 4.

The pawl 29 has a release finger 51 which extends into the path of the release dog 36. The spring 38 with the leverages provided exerts a preponderance of pressure over the spring 32, or spring 35 as the case may be, so that when the parts are not otherwise effected the spring 38 will force the dog 29 through the dog 36 and release finger 51 to a position which will clear the ratchet teeth 31 or the ratchet 20. The position of the parts under these conditions is clearly shown in Fig. 2.

The operation is as follows: Starting with the parts in the position shown in Fig. 2, the pawl 29 has just been released by reason of the fact that the load has been taken up by the pawl 33 and the preponderance of pressure of the spring 38 above described. The operating lever is then advanced carrying the pawl 29 forward. As the pawl moves forward the release finger 51 moves along the dog 36 and allows the pawl to enter the second notch above the pawl 33. As it engages the tooth 31 and relieves the pressure of the ratchet wheel from the pawl 33 the pawl 33 is pushed outwardly by the dog 36 to the position shown in Fig. 4. The operating lever is then retracted allowing the ratchet wheel to advance so as to unwind the reel and as the swinging pawl is retracted in this movement the pawl 33 slides along the inner surface of the pawl 29 into position with the tooth next adjacent to the tooth engaged by the pawl 29. As soon as the load is taken up by the pawl 33 a further movement of the pawl 29 releases this pawl so that it snaps to the position shown in Fig. 2, the pawl 33 being locked in place by its engagement with the ratchet wheel under load. It will be noted that this is a single operating step by step mechanism and thus has an element of safety in that it is practically impossible to so manipulate the operating lever as to release one dog before the engagement of the other. This is very necessary in a device of this type because of the heavy load and the danger of permitting it to fall.

What I claim as new is:—

1. In a ratchet mechanism, the combination of a ratchet wheel; a fixedly mounted pawl; a swingingly mounted pawl operating on the ratchet wheel; a system comprising opposing springs operating on said pawls; and means for changing the relative strength of opposing springs for reversing the action of said pawls.

2. In a ratchet mechanism, the combination of a ratchet wheel; a fixedly mounted pawl operating on the ratchet wheel; a swingingly mounted pawl operating on the ratchet wheel; a spring operating on the fixedly mounted pawl; a spring operating on the swingingly mounted pawl; a disengaging finger acting on said pawls; a spring operating on the disengaging finger; and means independent of the disengaging finger for varying the tension of said last-mentioned spring to reverse the action of the pawls.

3. In a ratchet mechanism, the combination of a ratchet wheel; a fixedly mounted pawl operating on the ratchet wheel; a swingingly mounted pawl operating on the ratchet wheel; a spring operating on the fixedly mounted pawl; a spring operating on the swingingly mounted pawl; a disengaging finger operating alternately on said pawls; a spring acting on said disengaging finger; and means for varying the tension of the last-mentioned spring to vary the action of the pawls.

4. In a ratchet mechanism, the combination of a ratchet wheel; a fixedly mounted pawl; a spring acting on said pawl; a swingingly mounted pawl; a spring acting on said swingingly mounted pawl; a disengaging finger operating alternately on said pawls, one of said pawls being guided into engagement with the ratchet wheel by direct engagement with the other of said pawls; a spring operating on the disengaging finger; and means for varying the tension on the last-mentioned spring to vary the action of the pawls.

5. In a ratchet mechanism, the combination of a ratchet wheel; a fixedly mounted pawl; a swingingly mounted pawl operating on the ratchet wheel; means for actuating the swingingly mounted pawl comprising a lever; a system comprising opposing springs operating on said pawls; and means for changing the relative strength of said opposing springs for reversing the action of said pawls, said means comprising a mechanism on said lever.

6. In a ratchet mechanism, the combination of a ratchet wheel; a fixedly mounted pawl; a swingingly mounted pawl operating on the ratchet wheel; means for actuating the swingingly mounted pawl comprising a lever; a system comprising opposing springs operating on said pawls; and means for changing the relative strength of said opposing springs for reversing the action of said pawls, said means comprising a mechanism having a portion concentric with the pivot of the lever.

In testimony whereof I have hereunto set my hand.

EDWIN J. ARMSTRONG.